Patented Oct. 31, 1933

1,933,070

UNITED STATES PATENT OFFICE 1,933,070

PROCESS FOR THE PRODUCTION OF SULPHONIC ACIDS

Stanislaw Pilat and Jaroslaw Sereda, Lwow, Poland

No Drawing. Application September 28, 1929, Serial No. 395,994, and in Poland July 1, 1929

3 Claims. (Cl. 260—159)

An application has been filed in Poland July 1, 1929.

In the treatment of mineral, vegetable and animal oils and of distillation products of coal, bituminous slate and the like, which is effected by means of sulphuric acid, a certain amount of so-called acid sludge (waste acid) is produced. In spite of the employment of numerous known methods of working up the acid sludge with different objects in view, for example with the object of recovery of the sulphuric acid or the production of asphaltic or resinous products, or again the recovery of the oil, the formation of emulsions or the like, the said acid sludge has hitherto formed an undesirable waste product which has generally been utilized by mixing it with coal dust and employing it for the firing of boilers.

The principal object of the present invention is to provide a process for working up the aforesaid acid sludges into sulphonic acids which are easily soluble in water.

Processes for the production of sulphonic acids from acid sludge are already known and one of these known processes, namely that described in U. S. A. Patent Specification No. 518,990, presents some similarities with the process according to the present invention. The said and other known processes, however, differ considerably from the process according to the present invention and according to the known process it is not possible to recover the whole quantity of the sulphonic acids contained in the starting material.

The characteristic feature of the known process resides in a suitable further sulphonation of the acid sludge by heating after separation of the oil. Then, after the removal of the excess of free sulphuric acid and the extraction of the soluble constituents with water a solution is obtained which contains sulphonic acids. This aqueous solution is treated with alkaline earth in order to precipitate in this manner the insoluble salt of the sulphonic acids, which is thereupon separated from the solution and is converted, for instance by means of alkali metal carbonate, into an alkali metal salt.

The said known process involves many inconvenient and expensive operations, for example the heating of strong acid products which easily causes corrosion of the containing vessels, and furthermore the extraction of the soluble constituents with hot water which, having regard to the resinous nature of the material, may cause difficulties in working on a commercial scale. Besides this in the said known process considerable quantities of the sulphonic acids are left behind in the starting material as a result of which losses occur.

In contradistinction to the said known process it is proposed according to the present invention to operate as follows:

Acid sludge is not heated for the purpose of further sulphonation but is neutralized with derivatives of alkaline earth metals, such as lime after the separation of the oil without any further operations, i. e. in its original condition, whereby the said acid sludge as starting material is separated into a part soluble in water and a part insoluble in water. In this manner the acid starting material is already neutralized at the commencement of the operations, whereby any possibility of corrosion of the vessels is avoided and all the sulphonic acids are quantitatively combined.

The neutralization product which is insoluble in water and which contains bitumen, oil, mineral substances and neutral substances as also insoluble salts of sulphonic acids is treated with aqueous alkali metal carbonate solution such as sodium carbonate solution, whereby an aqueous solution of alkali metal sulphonates suitable for further working up is obtained. In this manner the whole quantity of the sulphonic acids contained in the acid sludge can be obtained approximately quantitatively.

The essential feature of the invention therefore resides in the neutralization of acid sludge with derivatives of alkaline earth metals, whilst the sludge is in the original condition, i. e. in the condition in which it is obtained as a waste product, for instance in the purification of oils with sulphuric acid, and in the subsequent treatment of the neutralization product of the acid sludge and derivatives of alkaline earth metals, with alkali metal carbonate in order to obtain water-soluble alkali metal sulphonates directly from the solid or semi-solid neutralization product, which in addition to the insoluble alkaline earth sulphonates contains varying quantities of bitumen oil, neutral organic substances and mineral substances.

The process according to the present invention for working up acid sludge obtained as a by-product in the treatment by means of sulphuric acid of mineral, animal and vegetable oils, distillation products of coal, bituminous slate or similar raw materials, has for its principal object the separation of the sulphonic acids contained in the acid sludge so as to obtain them in the form of free acids or the salts thereof.

The first treatment according to the invention consists in a neutralization of the acid sludge by means of hydroxides or carbonates of the alkaline earth metals in order thereafter to separate the water soluble and insoluble sulphonates of the alkaline earth metals from one another. An aqueous solution of sulphonates of alkaline earths is thus obtained which can be separated in known manner, for example by decantation, from the precipitate containing insoluble salts or other residues. From the said aqueous solution the sulphonates of the alkaline earths contained therein are obtained by evaporation of the solution.

The sulphonic acid salts of the alkaline earths thus obtained may be contaminated with water-soluble mineral salts from which they can be separated by extraction of the crude sulphonates by means of an organic solvent, which dissolves these last-named salts.

The residue remaining after the separation of the solution of the water-soluble sulphonates of the alkaline earths, consisting of insoluble sulphonates of the alkaline earths together with neutral asphaltic and resinous substances, the sulphate of the alkaline earths and the excess of the base, is treated with an aqueous solution of an alkaline carbonate or bicarbonate or a mixture thereof in order to obtain an aqueous solution of the sulphonates of the alkalis thus formed. This solution is separated from the residue (which constitutes a waste product) and the alkaline sulphonates are separated therefrom by salting out the solution with a saturated solution of sodium chloride, removal of the water and drying, or by evaporation of the solution. The free sulphonic acids may be obtained by acidifying the solution of the sodium salts of the sulphonic acid by means of mineral acids (HCl, $H_2SO_4$). In this case the sulphonic acids separate out from the solution and collect, according to the density of the latter, on the surface or at the bottom of the vessel. After drawing off the aqueous solution containing the mineral acid and salts thereof and after drying in the air, a product is obtained which, according to the raw material from which it has been derived, is either viscous or solid, plastic or tough, water-soluble and forms a considerable amount of foam. By the employment of the process described sulphonic acids are obtained which do not contain any oil and only contain traces of mineral salts together with water. By washing the sulphonic acids with a diluted mineral acid, sulphonic acids entirely free from ash may be obtained.

In the above described process for the working up of acid sludges for the production of sulphonic acids or the salts thereof, the precipitate, which arises as a consequence of heating of the neutralization product with alkali carbonate, is obtained as a by-product. This product contains in addition to the sulphate, the carbonate of the alkaline earth which is more or less impregnated with neutral oily, resinous or asphaltic substances. If the amount of the asphaltic substances present is insignificant, the said product which contains the carbonate of the alkaline earth can be employed alone or in admixture with the bases of alkaline earths for the neutralization of the waste acid. If, on the other hand, the said product is saturated with asphaltic substances it can be employed after suitable treatment as an artificial asphalt, as an insulating material or for the manufacture of cements.

The following examples will serve to illustrate some preferred methods of carrying the invention into practice.

*Example 1.*—100 kilogrammes of acid sludge arising from the refinement of light oil by means of sulphuric acid were neutralized by gradual introduction into a sludge consisting of 40 kilogrammes of lime in 104 kilogrammes of water. The aqueous solution was separated from the precipitate and evaporated to dryness, whereby a yield of crude calcium sulphonates amounting to 12.3 per cent of the quantity of acid sludge was obtained.

The residual precipitate was boiled with an aqueous solution of sodium carbonate and the aqueous solution of sodium sulphonates thus obtained was then separated from the residue and acidified with sulphuric acid. After the sulphonic acids had settled at the bottom of the containing vessel the acid liquor was drawn off and the sulphonic acids were dried in the air whereby a yield of water-soluble sulphonic acids amounting to 42.5 per cent of the quantity of waste acid employed was obtained. The residual precipitate was employed for adding to lime for the further neutralization of acid sludge.

*Example 2.*—100 kilogrammes of acid sludge arising from the refinement of middle oil by means of sulphuric acid were neutralized by introduction into a sludge consisting of 25 kilogrammes of lime in 68 kilogrammes of water. The aqueous solution was separated from the precipitate and evaporated to dryness whereby a yield of crude calcium sulphonates amounting to 1.9 per cent of the quantity of acid sludge employed was obtained. The residual precipitate was boiled with an aqueous solution of sodium carbonate and the aqueous solution of sodium sulphonates thus obtained was separated from the residue and evaporated to dryness, whereby a yield of sodium sulphonates amounting to 30.6 per cent of the quantity of acid sludge employed was obtained. (If some quantity of water were allowed to remain in the sodium sulphonates the yield would amount to 43.4 per cent).

*Example 3.*—100 kilogrammes of acid sludge arising from the refinement of various mineral oils were neutralized by introduction into a sludge consisting of 39 kilogrammes of lime in 200 kilogrammes of water. The aqueous solution was separated from the precipitate and evaporated to dryness, whereby a yield of 3.6 per cent of crude calcium sulphonates was obtained. The residual precipitate was boiled with an aqueous solution of sodium carbonate whereupon the aqueous solution of the sodium sulphonates thus obtained was separated from the residue and was treated with a saturated solution of sodium chloride. The sodium sulphonates which were thus salted out were separated from the solution and dried whereby a yield of sodium sulphonates amounting to 32.1 per cent of the acid sludge was obtained. If the product were not allowed to dry the yield would amount to 60.9 per cent.

We claim:

1. Process for the treatment of acid sludge arising as a waste product in the refining, by means of sulphuric acid, of mineral, vegetable and animal oils, and distillation products of coal and bituminous slate, for the purpose of obtaining sulphonic acids and sulphonates from said sludge, comprising in steps: the neutralizing of the crude acid sludge by introducing it into a sludge consisting of derivatives of alkaline earth metals and water, capable of reacting with sulphuric acid and sulphonic acids thereby producing the alkaline earth metal salts of the sulphonic acids contained in the acid sludge; and treating the precipitate containing the insoluble alkaline earth metal sulphonates together with resinous and asphaltic components of the acid sludge and mineral salts, with an aqueous solution of an alkali metal carbonate to obtain an aqueous solution of the corresponding alkali metal sulphonates from which solution the latter are isolated in known manner, substantially as described.

2. Process for the treatment of acid sludge arising as a waste product, in the refining, by means of sulphuric acid, of mineral, vegetable and animal oils, and distillation products of coal and bituminous slate, for the purpose of obtaining sulphonic acids and sulphonates from said sludge, comprising in steps: the neutralizing of the crude acid sludge by introducing it into a sludge consisting of hydroxides of alkaline earth metals and water thereby producing the alkaline earth metal salts of the sulphonic acids contained in the acid sludge; and treating the precipitate containing the insoluble alkaline earth metal sulphonates together with resinous and asphaltic components of the acid sludge and mineral salts, with an aqueous solution of an alkali metal carbonate to obtain an aqueous solution of the corresponding alkali metal sulphonates from which solution the latter are isolated in known manner, substantially as described.

3. Process for the treatment of acid sludge arising as a waste product in the refining, by means of sulphuric acid, of mineral, vegetable and animal oils, and distillation products of coal and bituminous slate, for the purpose of obtaining sulphonic acids and sulphonates from said sludge, comprising in steps: the neutralizing of the crude acid sludge by introducing it into a sludge consisting of lime and water thereby producing the alkaline earth metal salts of the sulphonic acids contained in the acid sludge; and treating the precipitate containing the insoluble alkaline earth metal sulphonates together with resinous and asphaltic components of the acid sludge and mineral salts, with an aqueous solution of an alkali metal carbonate to obtain an aqueous solution of the corresponding alkali metal sulphonates from which solution the latter are isolated in known manner, substantially as described.

STANISLAW PILAT.
JAROSLAW SEREDA.